United States Patent [19]

Santos

[11] Patent Number: 5,558,398
[45] Date of Patent: Sep. 24, 1996

[54] SELF-ADJUSTING SEATING SYSTEM

[76] Inventor: James P. Santos, 1229 Notch Brook Rd., Stowe, Vt. 05672

[21] Appl. No.: 148,450

[22] Filed: Nov. 8, 1993

[51] Int. Cl.$^6$ .................................................. A47C 3/025
[52] U.S. Cl. ............................ 297/284.3; 297/284.6; 297/DIG. 3
[58] Field of Search ........................... 297/284.1, 284.3, 297/284.4, 284.6, DIG. 3, DIG. 8, 452.41

[56] References Cited

U.S. PATENT DOCUMENTS

| | | | |
|---|---|---|---|
| 2,434,641 | 1/1948 | Burns | 297/DIG. 3 X |
| 3,363,941 | 1/1968 | Wierwille | 297/DIG. 3 X |
| 3,982,786 | 9/1976 | Burgin et al. | 297/284.3 |
| 4,120,061 | 10/1978 | Clark | 297/DIG. 8 X |
| 4,969,684 | 11/1990 | Zarotti | 297/DIG. 3 X |
| 5,314,235 | 5/1994 | Johnson | 297/284.6 X |

*Primary Examiner*—Milton Nelson, Jr.
*Attorney, Agent, or Firm*—Spencer E. Olson

[57] ABSTRACT

A seat back for a seating system wherein the contour of the seat back is automatically adjusted to the spinal curvature of an occupant by a multiplicity of compressible interconnected plenum chambers which project horizontally forward from the seat back and are connected to a source of air under sufficient pressure to inflate and maintain the plenum chambers fully extended when the seat is unoccupied. The plenum chambers are interconnected by either very small-diameter tubing, or tubing having small-orificed restrictors therein for reducing the rate of flow of air from one chamber to another for introducing a time delay between movement of the occupant and inflation and deflation of the chambers affected by such movement. The plenum chambers are arranged in one or more arrays each consisting of vertically-separated pairs, the chamber of each pair being equally spaced from a vertical center-line. When an occupant is seated, or shifts position while seated, air is automatically distributed among the plenums, at a controlled rate, so as to alter the horizontal extension of the plenum chambers and, accordingly, the contour of the array(s) to the spinal contour of the occupant.

24 Claims, 2 Drawing Sheets

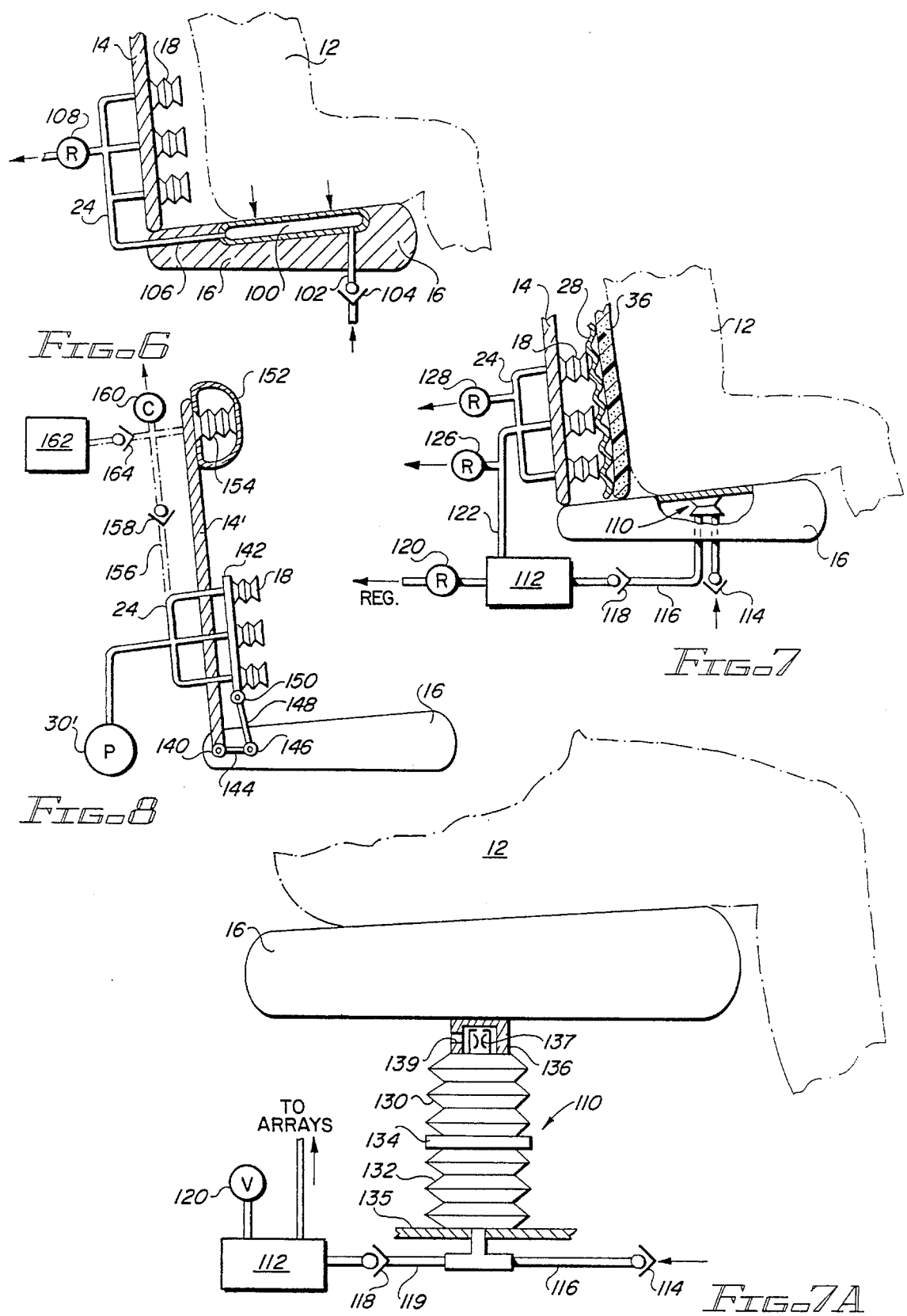

SELF-ADJUSTING SEATING SYSTEM

BACKGROUND OF THE INVENTION

This invention relates to seating systems in general and, more particularly, to a self-adjusting pneumatic seating system useful in vehicles, aircraft, offices and homes.

Through the millennia since man became a biped he has sought ways to be comfortably seated, progressively advancing from suitable rock formations to hewn and shaped materials. With the growth of civilization, fashion soon took precedence; aesthetically more attractive chairs were produced often with a corresponding compromise in comfort. The problem has been exacerbated in modern times in two respects: first, of the numerous seating options available for purchase, many are little more than sculptures with aesthetic value without regard for function or its potential benefit or liability to the user, and, second, between driving, office work, reading and watching television, modern society has become primarily a seated population. As a consequence tens of millions of people experience back problems with attendant lost time at work and discomfort at home, coupled with medical expenses. Additionally, some available seating systems, particularly in the automotive field, offer so many optional settings that the result is confusion which may actually increase the potential for increased musculoskeletal stress by incorrect settings. It is very difficult for the seated user to determine his or her spinal profile and to subjectively balance the spinal support mechanism to match his or her needs.

Improvements in seating have been made in recent years as a result of awareness generated by research into back problems and biomechanical analysis of the musculoskeletal system. The vertebral column comprises four functional parts: from top to bottom, cervical, thoracic, lumbar and sacrum. The cervical and lumbar portions are the most mobile, the thoracic relatively immobile and the sacrum, which is almost completely fixed to the pelvis, is immobile. When a person is standing, the vertebral column forms a compound curve comprising the cervical lordosis, thoracic kyphosis and the lumbar lordosis. Pelvic rotation influences the lumbar curvature; forward pelvic rotation increases the lumbar lordosis while backward pelvic rotation tends to flatten or even create a lumbar kyphosis, a condition that often occurs when a person is sitting. Research has shown that there is a wide variation in the thoracic and lumbar curves of normal spines, which must be accommodated in a flexible seating system. Because of the structural rigidity afforded by the rib cage, the thoracic zone generally needs accommodation to the existing profile, whereas the lumbar zone, on the other hand, requires not only substantial accommodation but adjustment because of its wide articulation capabilities that can result in high musculoskeletal stresses when improperly supported. Therefore, proper spinal support for a person in a seated position is an important component of one's health. Proper seating is particularly important to the many who work in offices, drive vehicles, fly aircraft or engage in other occupations requiring being seated for long periods of time.

Among recent advancements in seating technology is the active biomechanical seating system described in U.S. Pat. No. 4,944,544 by Gross and applicant Santos wherein the spinal profile of an individual is encoded on a device which, upon insertion into an electronic module, causes the seat back to conform to the standing spinal profile of that individual. Since spinal disc pressures are normally at their minimum when the individual is standing, by approximating that profile when the individual is seated theoretically should be beneficial to health by virtue of maintaining minimal disc pressures. However, by so doing, comfort is compromised by imposing the encoded standing profile on the spinal zone. It appears that the numerous muscle and ligament layers in the pelvic region are unduly stressed due to the average 28° pelvic rotation when a person is in a seated position.

While the theory advanced in the aforementioned patent may be applicable for high stress, very short duration seating in aerospace applications to avoid injury under high "G" forces, in situations requiring the individual to be seated for longer time periods it often is necessary to shift body position in an attempt to reduce musculoskeletal stresses on particular body components around the pelvic and lumbar areas. The described prior art system does not accommodate for such shifts in position, or slouching, except with the actuation of a manual override to compensate for such changes.

The pivot point of an adjustable seat back of a seating system averages seventeen centimeters from the pivot point of the ischial tuberosities about which the upper body rotates while seated. Changing the angle of the seat back relative to the seat pan completely changes the relationship of the spine of the seated individual to the support profile of the backrest due to the different curves defined by the different axes of rotation. Both the lordotic curve and the apex of the curve assume different positions relative to the seat back, and a slouched position compounds the problem of proper support. Under any of these conditions a presupposed and predetermined seat back support profile becomes incorrect; that is to say, in each of these cases the accuracy of the encoded spinal data settings or predetermined seat back profile is severely jeopardized.

Another deficiency of this and other known seating systems is that cushioning materials such as foams used on the backrest in most seating systems do not conform to the natural spinal curve of a person since cushion deformation is basically a non-linear function of applied force. The result is the generation of pressure points along the spinal column and adjacent musculature. Seating systems in which cushioning materials are combined with static, mechanical or pneumatic single lumbar supports provide maximum comfort levels for only a fraction of the population close to the fiftieth percentile with the result that the comfort of the rest of the population is compromised.

A primary object of the invention is to provide a new and improved spinal support device which eliminates the foregoing disadvantages of prior art seating systems.

It is another object of the present invention to provide a seating system for providing a seated individual customized spinal support with little or no adjustment of the seat back.

A more specific object of the invention to provide a new and improved pneumatic spinal support device which balances the forces exerted by the seat back on elements of the spine and avoids creation of pressure points.

Another object is to provide a spinal support device in the seat back of a seating system which automatically adjusts the curvature of the seat back to the spinal curvature of the occupant of the seating system.

Another object of the present invention is to provide a new and improved pneumatic spinal support device which is comparatively simple in construction and economical to manufacture.

SUMMARY OF THE INVENTION

In an illustrative embodiment of the seating system according to the invention, a seat back connected to a seat pan automatically adjusts to the spinal contour of the seated occupant. Self-adjustability is provided by an array of compressible cylindrical accordion-like plenum chambers each supported at one end on a seat back frame and extending horizontally forward therefrom, and arranged in arrays which straddle the vertical center line of the seat back frame. The plenums may be arranged in one, two or more arrays disposed one above the other: for example, a lumbar array consisting of three vertically-separated pairs of plenum chambers and a thoracic array disposed above the lumbar array and also consisting of three vertically-separated pairs of plenums. The interiors of the plenum chambers are interconnected by a system of tubing to be in fluid communication with each other and with a source of pressurized air. Air is supplied by a suitable pump to maintain the system at a pressure sufficient to inflate and maintain the plenum chambers' axial length fully extended when the seat is unoccupied. A profile support member which is flexible in the vertical direction and semi-rigid in the horizontal direction rests against or may be joined to the forwardly directed ends of the arrayed plenums, and a cushioning pad rests against and follows the contour of the profile support for isolating the occupant's back from the profile support.

With proper selection of the relative diameters and placement of the plenum chambers compressing the lumbar and thoracic arrays, the diameter of the interconnecting tubing and the internal pressure within the plenums, when a user is seated, or shifts position while seated, air is automatically distributed among the plenums so as to alter the axial length of the plenums and, therefore, adjusts the contour of the profile support member to the spinal contour of the occupant. The forces exerted by the profile support member on the spinal elements of the occupant are automatically balanced, without creation of pressure points, irrespective of the occupant's size, even if the occupant slouches or changes position relative to the seat back.

BRIEF DESCRIPTION OF THE DRAWINGS

Other objects, features and advantages of the invention will become apparent, and its construction and operation better understood, from the following detailed description when read with reference to the accompanying drawings, in which:

FIG. 6 is a fragmentary elevation side view showing a lumbar support and an alternative arrangement for pressurizing the pneumatic system;

FIG. 7 is a fragmentary elevation side view of the seating system showing yet another arrangement for pressurizing the plenum chambers;

FIG. 7A is a fragmentary elevation view of an alternative arrangement for pressurizing the plenum chambers; and FIG. 8 is an elevation side view of a second embodiment of the seating system which includes a pneumatically adjustable head rest.

DESCRIPTION OF THE PREFERRED EMBODIMENT

Figure 1:
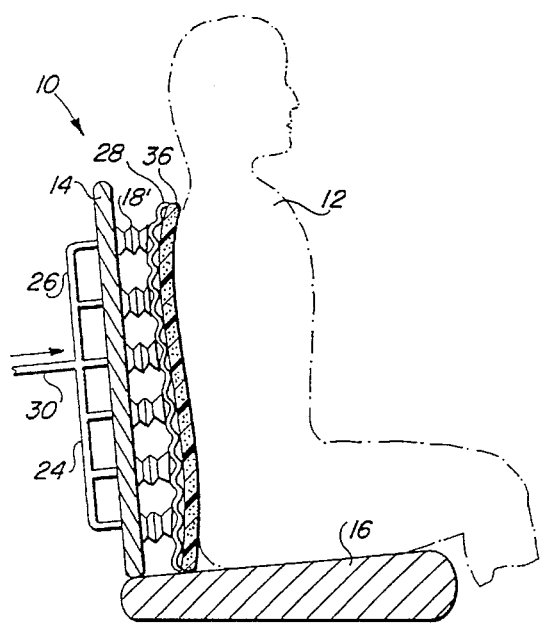
FIG. 1 is an elevation side view of a first embodiment of the seating system according to the invention showing an occupant seated thereon.
Figure 2:
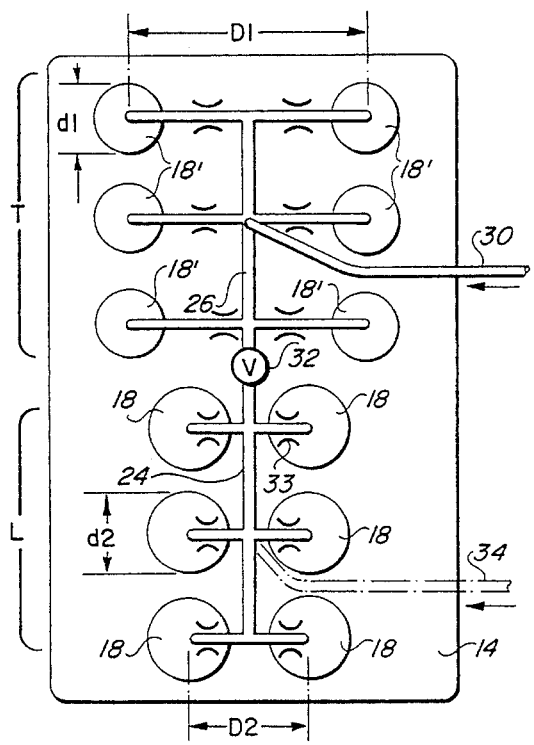
FIG. 2 is a diagrammatic elevation back view of the seating system of FIG. 1 showing a preferred arrangement of the plenum chambers.

Referring now to the drawings, FIGS. 1 and 2 diagrammetically illustrate an operational seating system 10 designed to separately support two of the three naturally mobile zones of the spinal column of an occupant 12, namely, the lumbar and thoracic zones which, as shown, have different curvatures. With a view toward satisfying the axiom that it takes a minimum of three points to define a curve, the lumbar and thoracic zones are each supported by a respective array of pneumatically adjustable plenum chambers each preferably consisting of three vertically-separated horizontally disposed pairs of plenum chambers. Each pair straddles the vertical center line of a seat back 14 which extends upwardly from the rear edge of a seat pan 26 with slight inclination from the vertical.

Figure 3:
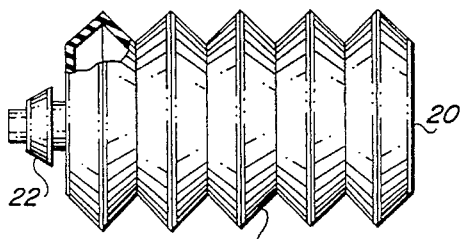
FIG. 3 is a side view of a plenum chamber used in the seating system.
Figure 3A:
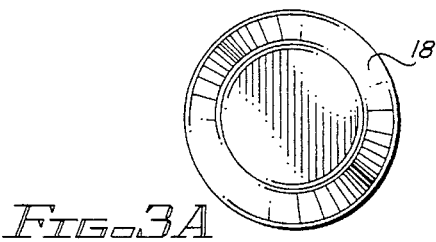
FIG. 3A is a view of one end of the plenum chamber.

The plenum chambers are constructed as shown in FIGS. 3 and 3A, consisting of a hollow cylindrical accordian-like bellows 18 formed of a suitable flexible plastic material such as LDPE or EVA, having a flat closure 20 at one end and a fitting or orifice 22 at the other end to which hollow tubing or a fitting may be attached. Typically, the major and minor diameters of the bellows are two inches and 1½ inches, respectively, the fully-extended length is approximately two inches and its compressed length is approximately ½ inch. Thus, the length of the plenum chamber is adjustable over a range of approximately 1½ inches and will depend upon its internal pressure and the force exerted on the closed end of the bellows; for a given interior pressure the force exerted on the closed end of the plenum chamber is proportional to its area.

Reverting to FIG. 2, the lumbar array L consists of three vertically-separated pairs of plenum chambers 18 of equal diameter d2 interconnected by a system of tubing 24 which includes suitable T-connectors and branch lines connected to the orifice end of the respective plenum chambers. The thoracic array T, disposed above the lumbar array, also comprises three vertically-separated horizontally disposed pairs of plenum chambers 18', the interiors of which are in communication with each other through a system of tubing 26 including suitable branch lines and T-connectors. The orifice end of each of the twelve plenum chambers are supported horizontally on seat back 14, with the closed end of each facing forward, toward the back of the seated occupant.

As seen in FIG. 2, which shows the orifice end of the plenums as viewed from behind the seat back 14, the spacing D1 between the centers of the thoracic zone plenums is greater than the spacing D2 between the lumbar zone plenums, the reason being that when pressures on different parts of the body of a seated individual are mapped, the greatest pressure in the thoracic zone occurs in the trapezius muscle group and scapula, the horizontal distance between which is somewhat greater than the distance between the erector spinae muscles running vertically alongside the spinal column in the lumbar region. The spacing D1 between the thoracic array plenum chambers 18' approximates the "average" distance between the left and right sides of the trapezies muscle group, whereas the lateral spacing $D_2$ between the chambers 18 of the lumbar array may be the "average" distance between the erector spinae and adjacent muscles. The source of these approximate distances is Anthropometric Source Book Data, NASA-RP-1024, 1978. The focus of the spinal support, for each zone, is close to or immediately adjacent to an appropriate plenum chamber even though the support provided by the plenums is distributed over a profile support member 28. In general, the plenum chambers of the lumbar and thoracic arrays are horizontally separated by distances to provide optimal support to the muscle groups in the lumbar region and in the thoracic region, respectively.

The interconnected arrangement of plenum chambers shown in FIG. 2 may be supplied by pressurized air from a single source represented by the line 30 connected to the tubing system 26 which, in turn, is connected via an open valve 32 to tubing system 24 with the same air pressure applied to all of the plenum chambers. The lumbar array, by virtue of the larger area of its chambers, will generate a greater force on the lumbar zone of the spine than the force generated by the thoracic array. The branch segments in tubing systems 24 and 26, may have an inside diameter of the order of ⅛ inch, and each has inserted therein a restrictor 33 consisting of an orifice of predetermined diameter smaller than the tube diameter for restricting the rate at which air may flow from one plenum chamber to another. Small bore tubing may be used in lieu of separate restrictors. The restrictors, or the small bore tubing, as the case may be, increase the time it takes for a given volume of air to pass from one plenum chamber to another thereby to prevent pressure surges which might otherwise be caused by a sudden shift in position of the occupant or by other events which affect the forces applied to the arrayed plenum chambers. The restrictors in the tubing system are not only active when the occupant is first seated, slouches or shifts position, hereafter sometimes referred to operation in the "vertical mode", but in the horizontal mode as well. Many persons, when seated, choose to position their body off-center of the seat or chair and/or may shift their weight from one side to the other to reduce muscular stress that inevitably occurs during long periods of sitting. The interconnected arrays of plenum chambers with their associated restricted diameter tubing will accommodate such off-center positioning and shifts in weight over a predetermined transitional time period so as to maintain full contact between the seat back and the elements of the occupant's spine.

As an alternative to the just-described systems of tubing for interconnecting the lumbar and thoracic arrays of plenum chambers, the valve 32 may be closed so as to isolate the two arrays from each other and the tubing system 24 of the lumbar array connected to a second, separate source of air under pressure represented by the dotted line 34. By using two sources of air, one for each array, the occupant may separately adjust the pressures within the lumbar and thoracic arrays for optimum support and comfort. Moreover, when employing two air supplies, plenum chambers of the same area may be used in both arrays and a somewhat higher pressure applied to the chambers of the lumbar array to achieve the above-described differential between the forces exerted on the occupant by the lumbar and thoracic arrays.

Reverting to FIG. 1, resting against or secured to the forwardly directed closed ends of the arrayed plenum chambers is profile support member 28 which, for example, may be made by thermoforming a polymer in a horizontally corrugated configuration to provide a high degree of flexibility in the vertical direction and semi-rigidity in the horizontal direction. This construction allows member 28 to move rearwardly from a forward "rest" position assumed when the plenum chambers are all fully extended and to establish a profile having a shape dependent on the relative degree of compression of individual plenums which, in turn, depends on the position and weight of the occupant and the distribution of the forces exerted by the seated occupant on the profile support member. A flexible pad 36, which may be made of a polymeric or elastomeric foam, rests against and follows the contour of profile support member 28 and increases the comfort quotient of the seated occupant 12. The pad 36 is not so thick as to overshadow the benefits provided by the pressurized plenum chambers, preferably being only thick enough to cushion irregularities or voids that may be present in the profile support member 28. Depending on the inflation pressure or pressures of the plenum chambers, a certain degree of cushioning is also inherent in the action of the plenum chambers in combination with the flexing, in the vertical direction, of profile support member 28.

It is within the contemplation of the invention to configure the plenum chamber arrays differently than described hereinabove, and other arrangements for distributing air between the chambers are also possible. For example, not only may the chambers be interconnected both horizontally and vertically as in the systems described thus far, but the chambers forming a vertical column may be interconnected with each other and isolated from another group of chambers forming another vertical column. In automobiles, where seat widths often are narrowed with side bolsters, an array of two vertically-spaced pairs of horizontally arranged plenum chambers, utilizing either of the described plumbing arrangements, may be sufficient. In applications such as office chairs, which have wider seats, an array of three or more vertically-separated pairs of horizontally arranged plenum chambers may be preferred because of the high degree of horizontal displacement and spinal support afforded by this arrangement. For wheelchair users with spinal deformities, profile support member 28 may be divided such that smaller portions of each area can respond to changes in all three axes.

Figure 4:
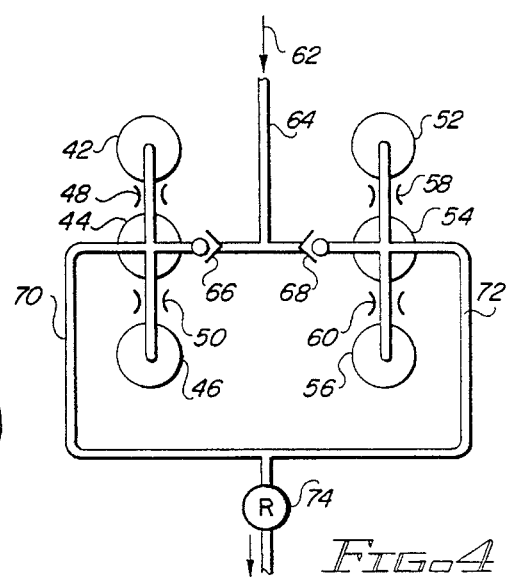
FIG. 4 is an elevation view diagrammatically illustrating a lumbar-support device and an alternative arrangement for distributing air among an array of plenum chambers.

An example of a plumbing system for isolating one vertical column of plenum chambers from another is shown in FIG. 4, embodied in an arrangement of three vertically-separated pairs of plenum chambers. The three chambers 42, 44 and 46 which form the left-hand column are interconnected with two sections of tubing which may be provided with restrictors 48 and 50, respectively, and chambers 52, 54 and 56 forming the right-hand column are similarly interconnected with two sections of tubing which may be provided with restrictors 58 and 60, respectively. Again, very small bore tubing may be used and the restrictors dispensed with. Air under pressure from a source represented by the arrow 62 is applied via a section of tubing 64 to the junction between a pair of one-way check valves 66 and 68 through which air is supplied to the left-hand and right-hand columns of chambers, respectively, but which prevent the passage of air from one side of the assembly to the other. This arrangement requires fewer restrictors to attenuate the passage of air among the chambers than the one shown in FIG. 2, and offers the designer the option of not allowing air to be transferred back and forth from one vertical column to the other and thus to provide better support to the occupant of a vehicle seat subjected to frequent and lengthy turns, or of an occupant of an office chair who frequently shifts body position from side to side. The pressure within the chambers forming the two vertical columns may be equalized by sections of tubing 70 and 72 interconnected with the left-hand and right-hand columns, respectively, and coupled to a common release valve 74. If desired, each of the one-way check valves 66 and 68 may be replaced with a restrictor having a smaller orifice than those in restrictors 48, 50, 58 and 60, to create a longer time delay for air to flow in the horizontal direction between the two columns than for air to flow between the plenum chambers of a given vertical column. These optional restrictors may be of the variable type, the transmission capacity of which is dependent on the magnitude of the force or pressure applied to the restrictor.

Figure 5:
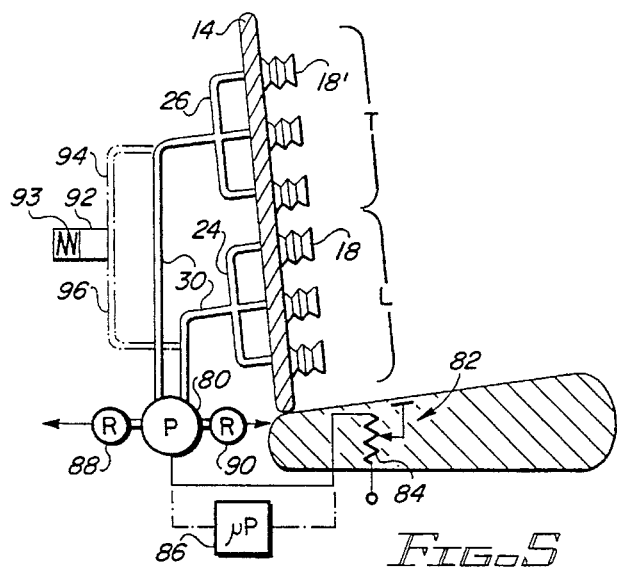
FIG. 5 is an elevation side view of the seating system of FIG. 1 showing a first pneumatic system for pressurizing the plenum chambers.

Among possible sources of air for pressurizing the plenum chambers is the arrangement of FIG. 5 shown interconnected with two vertically-separated arrays of six chambers each, that is, the arrangement shown in FIGS. 1 and 2. Air is supplied to the tubing systems 24 and 26 by a pneumatic pump 80; the pump may be driven in any of a number of known ways such as electrically, manually, or by manually squeezing a simple elastomeric bulb, and activation of the pump may be manual or automatic. In the system shown in FIG. 5, the pump 80 is automatically activated by a pressure or displacement sensor 82, disposed within the seat pan 16 near the upper surface thereof, and arranged to adjust a potentiometer 84 connected to a voltage source to develop an electrical signal which activates the pump. The pump drives air under pressure, typically 1.0 to 3.0 p.s.i., through tubing systems 24 and 26 into the interconnected plenum chambers. There is a correlation between the occupant's weight, which is concentrated on the ischial tuberosities, and the pressure exerted on the plenum chambers 18 and 18' by the upper body of the seated occupant. The displacement or pressure may be translated to time or pressure values by a microprocessor 86 which, in turn, activates and instructs pump 80 to operate for a period sufficient to produce a predetermined pressure in the interconnected system of plenum chambers. The microprocessor 86 may store pressure information which provides optimum comfort for each of a number of likely occupants of the seating system so that the occupant calls up his or her identification, the microprocessor will activate the pump 80 for a time period sufficient to generate a pressure that is optimum for that person. The microprocessor may also function as a servomechanism which evaluates the pressure feedback from the sensor/potentiometer arrangement 82, 84 and the seat back 14 and adjusting the output of pump 80 accordingly.

Alternatively, microprocessor module 86 may be programmed as a computer to determine the pressure gradients between the different zones that will give optimum spinal support to the seated occupant. The weight of the individual expected to use the seating system, and also data describing that individual's seated and standing spinal profile is inputted to the computer; the computer program averages the pressure values in the different zones and determines what the pressure should be in each zone for maximum comfort and benefit. A manual override, similar in function to the lines 72 and release valve 74 in FIG. 4, may take the form of release valves 88 and 90 coupled to pump 80 and adapted to be opened and closed by the seat occupant for manually adjusting the fluid pressure within the system.

The system of FIG. 5 may optionally include an expansion tank 92 connected by sections of tubing 94 and 96 to the output 30 of pump 80 for further smoothing the transfer of air from one plenum chamber to another as the occupant changes position. The expansion tank 92 may incorporate a spring-loaded diaphragm 93 to compensate for cabin pressure changes in aircraft, thereby maintaining the desired plenum chamber displacement.

It being impractical for office chairs to have external wiring for supplying electrical power for driving an on-board air pump, or to use batteries for the purpose, the alternative to the FIG. 5 embodiment illustrated in FIG. 6 is useful in office chair applications of the invention. The system, which is self-inflating, includes a self-inflating cushion 100 incorporated in the upper layer of the seat pan 16, a section of tubing 106 connected between the cushion and the system 24 of tubing interconnecting the array of plenum chambers 18, a section of tubing 102 and a one-way check valve 104 connecting the interior of cushion 100 to the atmosphere and a release valve 108 connected to the interconnecting tubing system 24. When the user 12 sits on the cushion, air is displaced therefrom through tubing 106 and into plenum chambers 18, which, in turn, are pressed by and offer support to the seated occupant's back. Should the user wish to increase the support provided by the plenum chambers, that is, increase the horizontal displacement of the closed forward-directed ends thereof, he or she partially rises from the seat pan 16 in order to inflate cushion 100 by creating a vacuum condition and allowing ambient air to enter the system through check valve 104. Alternatively, the cushion 100 and check valve 104 may be dispensed with and the chair back controlled through the use of plenum chambers with properties so as to be self-inflating. In this instance, the seated user merely leans forward to remove the compressive force exerted on the plenum chambers, allowing them to extend and create a vacuum condition within the array 18 of plenum chambers which, by pressing and momentarily opening release valve 108 will allow ambient air to enter the chambers of the array through the system of interconnected tubing. Should this change of air result in greater than desired horizontal extension of the plenum chambers, the release valve 108 may be pressed to release air until the desired horizontal displacement is achieved. Thus, the air pressure within the system and the horizontal displacement of the chambers can be regulated with minimum controls.

A fourth system for controlling the interior pressure of the plenum chambers, illustrated in FIG. 7, includes an air charging assembly 110, which may include a plenum chamber of construction similar to that shown in FIG. 3, disposed in the upper layer of seat pan 16. A check valve 114 embodied in or connected to device 110 allows air to enter the device when the occupant 12 shifts position, arises, or experiences up and down movement as might occur in the seating system of a vehicle traveling on a bumpy road. The output of charger device 110 is connected to an accumulator chamber 112 through a section of tubing 116 which contains a check valve 118 which allows air to flow only in the direction toward accumulator 112. Thus, this arrangement allows air to be drawn into charger device 110 and to be transferred into accumulator 112, through check value 118, which prevents air flow back to the charger device.

Accumulator 112 has incorporated therein or connected thereto a relief valve 120 calibrated to open at a predetermined safe pressure. Accumulator 112 is connected via a section of tubing 122 and a check valve 124 to the tubing system 24 which interconnects the lumbar array of chambers. A spring-loaded release valve 126 connected between check valve 124 and tubing system 24, and disposed to be accessible to the occupant, allows the occupant to pressurize the array to a desired pressure. A spring-loaded release valve 128 interconnected with tubing system 24 and disposed to be accessible to the occupant is operative, when pressed, to reduce the pressure within the plenum chambers. Accumulator 112 is continually charged by charger device 110 in response to movement of the seated occupant, and eliminates the need for an otherwise powered pump. An added benefit of the pneumatic system shown in FIG. 7 is its potential to function in a vehicle seat as an energy absorption device in the event of a rear-end crash. The release valve 128 may be set to release the air contained in accumulator 112 at a preset pressure so as to attenuate the rate of rearward acceleration of the seat occupant.

FIG. 7A shows an air charging system 110 having a different construction than that shown in FIG. 7 which will automatically accommodate to a wide range of difference in weight of the seat occupant. The pressure generated in a plenum chamber being proportional to the difference between the initial volume and the compressed volume, the system must be capable of generating sufficient pressure to charge the plenum chambers whether the occupant weighs one-hundred pounds or two hundred twenty-five pounds. To this end, the charging device comprises a pair of serially-connected plenum chambers 130 and 132 joined together at their closed ends by a base 134 which is adapted to move up and down as the chambers are compressed or expand. The neck of plenum chamber 130 has a restrictor 137 inserted therein and is surrounded by a collar 136 that bears against the underside of seat pan 16. Alternatively, the upper end of plenum chamber 130 may be mounted within a recess formed in the seat pan so as to be closer to the upper surface of the seat pan to enhance the transmission thereto of displacement of the upper surface and result in more efficient charging of the accumulator 112. The collar 136 is closed except for an air passage 139 formed in a wall thereof which allows free passage of air to the atmosphere as the pressure and volume of chamber 130 changes.

The lower end of plenum chamber 132 rests upon a horizontally-oriented bracket 135 which, in turn, is solidly affixed to the seat assembly. The spacing between bracket 135 and the point of contact between collar 136 and seat pan 16 is such that plenum chambers 130 and 132 are both fully extended when the seat is unoccupied. The interior of plenum chambers 132 is coupled, via a T-connector inserted in its neck, to accumulator 112 through line 119 and a check valve 118, and through line 116 to a check valve 114. An increase in pressure within plenum chamber 132 in response to vertical deflection of seat pan 16 by a seated occupant is transmitted to accumulator 112.

In operation, a user seated on the seat pan 16 causes compression of both of the serially-connected plenum chambers 130 and 132, but at different rates. The restrictor 137 in the neck of chamber 130 limits the rate at which air is expelled from the chamber and, as a consequence, the amount by which the chamber is compressed as a function of time, whereas the volume of plenum chamber 132, being essentially open-ended through tube 116 and check valve 118, responds rapidly to changes in applied weight. The two plenum chambers being connected back-to-back via the base 134, the base is continuously adjusted to new positions determined by the rapid changes in volume of plenum chamber 132 to transient short term fluctuations and the slow changes in volume of plenum chamber 130 to static or long term weight changes. In this fashion, the charging system 110 is capable of generating the desired pressure in the arrayed plenum chambers for a wide range of user weights.

If a seat back constructed in accordance with either of the described embodiments is inclined more than about 30 degrees from the vertical, the anterior neck muscles of the occupant are stressed and cause discomfort and fatigue; thus, it is important that the head be supported in the area of the atlanto-occipital membrane for reducing musculoskeletal stress and improving the comfort and also the safety of the occupant. A backrest adapted for inclination relative to the seat pan, shown in FIG. 8, has a support frame 14' hingedly joined to the back edge of seat pan 16 along a horizontal axis 140. The lumbar array of plenum chambers 18 is preferably mounted on a plate 142 separate from back frame 14',with its lower edge linked to the lower edge of back rest frame 14' by a linkage arrangement including a rod 144 connected between axis 140 and a pivot point 146 and a second rod 148 connected between pivot point 146 and a horizontal axis 150 disposed along the lower edge of plate 142. The plenum chambers mounted on plate 142 are pressurized by a suitable pump 30' connected to the interconnecting tubing system. A head rest 152 is secured to and extends across the upper edge of seat back frame 14' and may comprise a single chamber or, preferably incorporates a pair of horizontally displaced plenum chambers, one of which is visible at 154, to which air under pressure is supplied by a system of tubing 156 interconnected with tubing system 24 and the source of pressure 30'. The tubing system 156 may include an optional check valve 158 and a release valve 160.

As seat back frame 14' inclines, the back of occupant (not shown in FIG. 8) exerts increasing pressure on plenum chambers 18, which forces air through tubing connector 156 into plenum chamber 154 in the head rest. The result is that the increased pressure on plenum chamber 18 causes inflation of plenum chamber 154 and greater forward horizontal displacement of headrest 152. The seated occupant may, if desired, press release valve 160 to adjust the pressure and, thus, the horizontal displacement of the forward ends of the plenum chambers in the headrest.

Reverting to the earlier discussion of the effect of seat back inclination on the relationship of the spinal profile of the seated occupant, the linkage arrangement shown in FIG. 8 preserves the desired relationship regardless of the inclination of the seat back frame. As an alternative to the linkage mechanism, plate 142 may have means mounted thereon for enabling the seated user to adjust the vertical position of plenum chambers 18 on the inclined seat back to the optimum location.

It is also within the contemplation of the invention to construct the head rest as an independent unit, adapted to be inflated by means other than the source 30' and interconnected systems of tubing. In particular, the head rest may comprise a pair of horizontally-separated self-inflating plenum chambers interconnected by tubing and coupled to an accumulator 162 through a relief valve 164. Air is initially allowed to enter the plenum chambers and, thereafter, the release valve 160 may be adjusted to adjust the pressure in the plenum chambers to a desired value. In the rebound from the compression of the air in plenum chambers 154 which may result from a moving vehicle being struck from the rear, the air in the plenum chambers may be transferred via relief valve 164 to enter accumulator 162 or, alternatively, directly into the atmosphere. The plenum chambers of the lumbar array may also be vented through relief valve 164, if desired.

While several embodiments of the invention have been shown and described, it is to be understood that the invention is not limited thereto but is susceptible of numerous changes and modifications as will now become evident to those skilled in the art. For example, although disclosed embodiments of the invention are described and illustrated as being implemented with hollow, compressible cylindrical accordian-like plenum chambers, alternative plenum chamber designs may be employed without departing from the spirit of the invention. Alternative forms of compressible plenum chambers include chambers with an air-impermeable cover and an air-permeable filling, and chambers with internal baffles and including means for communication and flow restriction, and for purposes of the appended claims are intended to be "elongated compressible plenum chambers." Also, although the invention has been described as incorporated in the seat back of a seating system that also includes a seat pan, it is within the contemplation of the invention to mount a multiplicity of compressible interconnected plenum chambers and a source of air under pressure on a suitable support to provide a portable adjustable backrest adapted for placement against the usual backrest of an office chair or auto seat. Also, while the described system utilizes air as a fluid medium, it will be understood that the principles of the invention can be employed in a system using a liquid fluid medium. Therefore, it is not intended that the invention be limited to the details shown and described herein but, rather, the intention is to cover all such changes and modifications as come within the spirit and scope of the appended claims.

I claim:

1. A back support system for a seat which automatically adjusts to the spinal curvature of an occupant of the seat, comprising;

a rigid seat back support member adapted to be oriented substantially vertically;

a multiplicity of elongate hollow, fluid-filled, accordion-like plenum chambers each having opposed first and second ends and each having an orifice in said first end and being closed at said second end and compressible over a predetermined range an extended length and adapted to resiliently resist load along an axis passing centrally through said ends, the first end of said plenum chambers being supported on said seat back support member with their said axis oriented substantially perpendicularly thereto with their closed second ends facing forward and arranged in at least one array comprising at least one horizontally spaced pair of plenum chambers disposed on respective opposite sides of a vertical center line of said back support member, each array for supporting a respective zone of an occupant's spinal column, and fluid passage means directly interconnecting through respective orifices the interiors of all of said plenum chambers for automatically distributing fluid among the interiors of the plenum chambers of an array responsively to changes in the degree of compression thereof caused by differences in loading on the forwardly facing closed ends of the plenum chambers of said array due to movement of a seated occupant, while restricting the flow of fluid among plenum chambers to a rate which introduces a time delay between such movement and changes in the degree of compression of plenum chambers affected by such movement and configuring the closed ends of the arrayed plenum chambers to substantially correspond to the contour of the spinal zone of the occupant that is supported by an array;

a flexible support member overlying the forwardly-facing closed ends of said arrayed plenum chambers, said support member being more flexible in a vertical direction than in a horizontal direction and adapted to move rearwardly from a forward position at which said plenum chambers are at said extended length to establish a profile having a contour dependent on the relative degree of compression of individual plenum chambers; and cushion means overlying and adapted to follow the contour of said support member for isolating a seated occupant's back from said support member.

2. The back support system of claim 1, wherein said plenum chambers are arranged on said seat back support member in at least two vertically separated arrays, each comprising at least one horizontally spaced pair of plenum chambers disposed on opposite sides of said vertical center line, for supporting the lumbar zone and the thoracic zone, respectively, of an occupant's spinal column, wherein the closed ends of the plenum chambers of said lumbar-supporting array are of equal area, larger than the area of the closed ends of the plenum chambers of said thoracic zone-supporting array, and means for supplying fluid to the interiors of said plenum chambers and said fluid passage means at a pressure sufficient to maintain said plenum chambers at said extended length when the seat is unoccupied.

3. The back support system of claim 1, wherein said plenum chambers are arranged on said back support member in at least first and second vertically separated arrays for supporting the lumbar zone and the thoracic zone respectively, of the spine of a human occupant, wherein all of said plenum chambers have the same area, wherein the interiors of the plenum chambers of said first array are in fluid communication with each other and with means for supplying fluid at a first pressure, and wherein the interiors of the plenum chambers of said second array are in fluid communication with each other and with means for supplying fluid at a second pressure different from said first pressure.

4. The back support system of claim 1, wherein said plenum chambers are arrayed on said seat back support member in first and second vertically separated arrays for supporting the lumbar and thoracic zones, respectively, of a human spine, wherein the plenum chambers of said first array are disposed on opposite sides of said vertical center line and horizontally spaced by a distance to provide optimum support to the muscle groups in the lumbar region and wherein the plenum chambers of said second array are disposed on opposite sides of said vertical center line and horizontally spaced by a distance to provide optimum support to the muscle groups in the thoracic region.

5. The back support system of claim 1, wherein said fluid passage means comprises a system of tubing having a bore size which restricts flow of fluid among plenum chambers of said array to a rate which prevents surges which might otherwise be caused by sudden changes in loading.

6. The back support system of claim 5, wherein said system of tubing includes restrictors placed at selected locations for determining the size of said fluid passage means.

7. The back support system of claim 1, wherein each of said at least one array comprises a plurality of vertically spaced pairs of plenum chambers arranged in vertically-oriented first and second columns spaced equidistantly from said vertical center-line, and wherein the chambers of each pair are horizontally aligned.

8. The back support system of claim 7, wherein each array comprises at least three vertically-spaced pairs of plenum chambers.

9. The back support system of claim 7, wherein said means for interconnecting includes a section of tubing connected to a source of fluid pressure and to valve means for introducing equal fluid pressure to the plenum chambers constituting said first and second columns and for preventing transfer of fluid pressure from one of said columns of chambers to the other, and valve means connected by tubing between the interconnected chambers constituting said first column and the interconnected chambers constituting said second columns for equally releasing the interior pressure of the chambers of both columns.

10. A self-adjusting seating system including a seat pan and a seat back having a spinal support system which adjusts automatically to the spinal curvature of an occupant, said seating system comprising:

said seat pan having front and rear edges and adapted to be supported substantially horizontally;

a rigid seat back support member connected to the rear edge of said seat pan and oriented substantially vertically;

a multiplicity of elongate air-filled cylindrical plenum chambers all having an extended length and opposed first and second ends, each having an orifice formed in said first end and said second end of each being closed, said first end of said plenum chambers being supported on said seat back support member with said closed second end facing forwardly and together defining a plane substantially parallel to said back support member, said plenum chambers being arranged in at least one array of at least one horizontally spaced pair of plenum chambers disposed on respective opposite sides of a vertical center line of said back support member, each array for supporting a respective zone of a seated occupant's spinal column, each plenum chamber being compressible from said extended length and adapted to resist load applied to said second closed end along an axis passing centrally through said opposed ends, means including a system of tubing directly interconnecting through respective orifices the interiors of all of said plenum chambers for automatically distributing air among the plenum chambers of an array in delayed response to changes in degree of their compression caused by differences in loading on said second closed end of the plenum chambers of an array due to the weight and movement of a seated occupant, and thereby vary the extent to which each plenum chamber is compressed from its extended length and configure the closed ends of the arrayed plenum chambers to substantially correspond to the contour of the spinal zone of occupant supported by an array, and means for supplying air to said interconnecting means and the interiors of said plenum chambers at a pressure sufficient to maintain said plenum chambers at said extended length when the seating system is unoccupied;

a support member overlying the forwardly facing closed ends of said arrayed plenum chambers providing flexible support between a seated occupant's back and the spaced closed ends of said plenum chambers and distributing the load of a seated occupant over more than one plenum chamber, the contour of said support member being adapted to change in response to changes in the extent of compression of individual plenum chambers to correspond substantially to the contour of the closed ends of the arrayed plenum chambers, and cushion means overlying and adapted to follow the contour of said support member for separating a seated occupants' back from said support member.

11. Seating system according to claim 10, wherein said means for supplying air under pressure comprises a further plenum chamber supported in said seat pan at a location at which it is adapted to be compressed by the weight of a seated occupant, and means for providing fluid communication between the interior of said further plenum chamber and said system of tubing including an accumulator and a check valve for causing air flow only in a direction from said further plenum chamber to said accumulator.

12. Seating system according to claim 10, wherein said means for supplying air under pressure comprises first and second further plenum chambers serially connected closed end-to-closed end supported beneath said seat pan with the orifice of said first further plenum chamber confronting said seat pan at a location at which said further plenum chambers are adapted to be compressed by the weight of a seated occupant, wherein said first further plenum chamber includes restrictor means open to atmosphere and wherein the orifice of said second further plenum chamber is coupled to a check valve open to atmosphere and is in fluid communication with said system of tubing.

13. Seating system according to claim 10, wherein said system further comprises a headrest supported on said seat back support member, and wherein said headrest comprises at least one additional plenum array in fluid communication with the system of tubing which interconnects said arrays of plenum chambers.

14. Seating system according to claim 13, wherein said means for supporting said plenum chambers on said seat back support member includes means for moving said arrayed plenum chambers relative to said seat back support member for maintaining predetermined relationships between said arrayed plenum chambers and said seat pan.

15. Seating system according to claim 14 wherein said means for moving said arrayed plenum chambers relative to said seat back support member includes a plate on which said arrayed plenum chambers are supported, and a linkage connected between said seat pan and said plate for moving said plate relative to said seat back support member in response to movement of said seat back support member from a vertical.

16. Seating system according to claim 10, wherein said plenum chambers are self-inflating.

17. Seating system according to claim 16, wherein said means for supplying air under pressure to said system of tubing comprises pump means in fluid communication with said system of tubing, sensing means positioned within said seat pan for producing an output proportional to the pressure exerted on the seat pan by the weight of a seated occupant and means operative responsively to the output of said sensing means for controlling said pump means and the air pressure within said plenum chambers.

18. Seating system according to claim 17, wherein said means for controlling said pump means includes memory means for storing data representing optimum plenum chamber pressure for anticipated occupants of the seating system.

19. Seating system according to claim 17, wherein said means for supplying air under pressure includes an expansion tank in fluid communication with said system of tubing.

20. Seating system according to claim 19, wherein said expansion tank is vented to the atmosphere.

21. Seating system according to claim 19, wherein said expansion tank is closed to the atmosphere.

22. A back support system for a seat which automatically adjusts to the spinal curvature of an occupant, comprising, in combination:

a rigid seat back support member adapted to be supported substantially vertically and having a vertical center line;

a plurality of air-filled elongate cylindrical fluid-impervious accordion-like plenum chambers each having opposed first and second ends and each having an orifice at said first end and being closed at said second end and being longitudinally compressible over a predetermined range from an extended length, each adapted to resiliently resist load along a longitudinal axis passing through said opposed ends, said plenum chambers being supported at said first end on said back support member and extending forwardly generally perpendicular thereto with the second ends arranged in at least one array comprising at least one pair of second ends disposed at opposite sides of and horizontally spaced from said vertical center-line, forwardly facing second ends of said plenum chambers providing a like array of spaced apart load supporting surfaces, and air-passage means interconnecting through respective orifices the interiors of all of said plenum chambers whereby to automatically distribute air among said plenum chambers in delayed response to changes in degree of their compression caused by differences in loading on said support surfaces due to movement of a seated occupant, thereby to vary the extent to which each plenum chamber is compressed from said extended length and configure said support surfaces to exhibit a contour corresponding substantially to the spinal curvature of the occupant, while restricting air flow among said plenum chambers to a rate which substantially prevents pressure surges which might otherwise occur due to sudden changes in loading on said support surfaces; and a flexible support member having greater flexibility in a vertical direction than in a horizontal direction overlying the forwardly facing array of load supporting surfaces and adapted to flex rearwardly from a position at which said plenum chambers are at said extended length and establish a profile the contour of which is dependent on the relative degree of compression of individual plenum chambers.

23. The back support system of claim 22 further including means for supplying air to the interiors of said plenum chambers and to said interconnecting means as needed to maintain the interior pressure of said plenum chambers at a pressure sufficient to maintain said plenum chambers at said extended length when the seat is unoccupied.

24. The back support system of claim 22, wherein said plenum chambers are arranged in at least two vertically-separated arrays each comprising a plurality of vertically spaced pairs of plenum chambers arranged in vertically-oriented first and second columns spaced equidistantly from said vertical center-line, wherein the plenum chambers of each pair are horizontally aligned and wherein the interiors of the plenum chambers of said at least two arrays are in fluid communication with one another.

* * * * *